Sept. 19, 1944.　　C. J. HOLLAND ET AL　　2,358,510
SPRING SNUBBER UNIT
Filed Jan. 9, 1942　　2 Sheets-Sheet 1
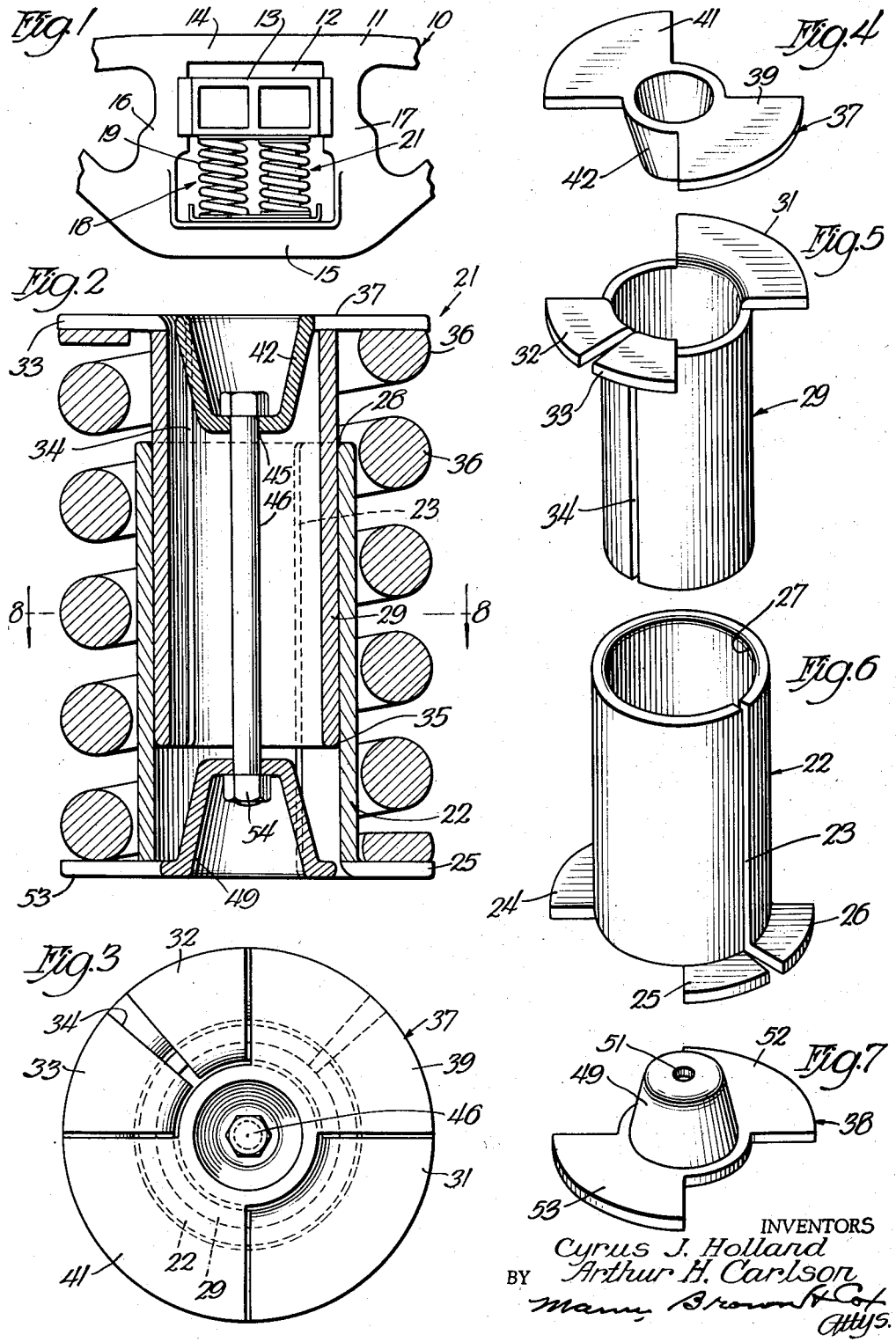
INVENTORS
Cyrus J. Holland
Arthur H. Carlson
BY
Mann, Brown & Co.
Attys.

Sept. 19, 1944.   C. J. HOLLAND ET AL   2,358,510
SPRING SNUBBER UNIT
Filed Jan. 9, 1942   2 Sheets-Sheet 2
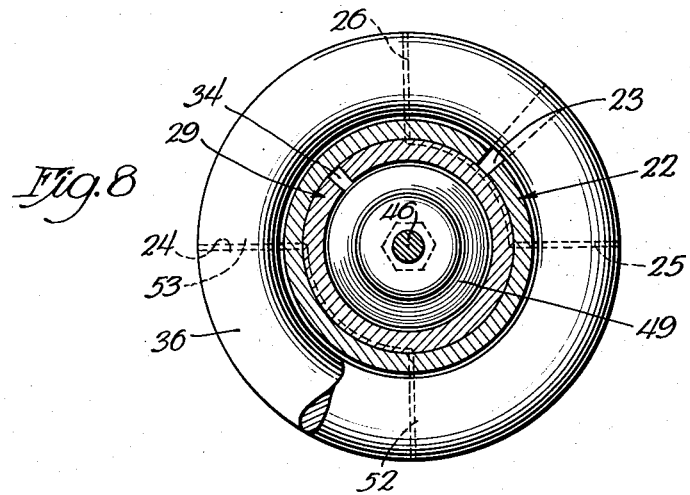
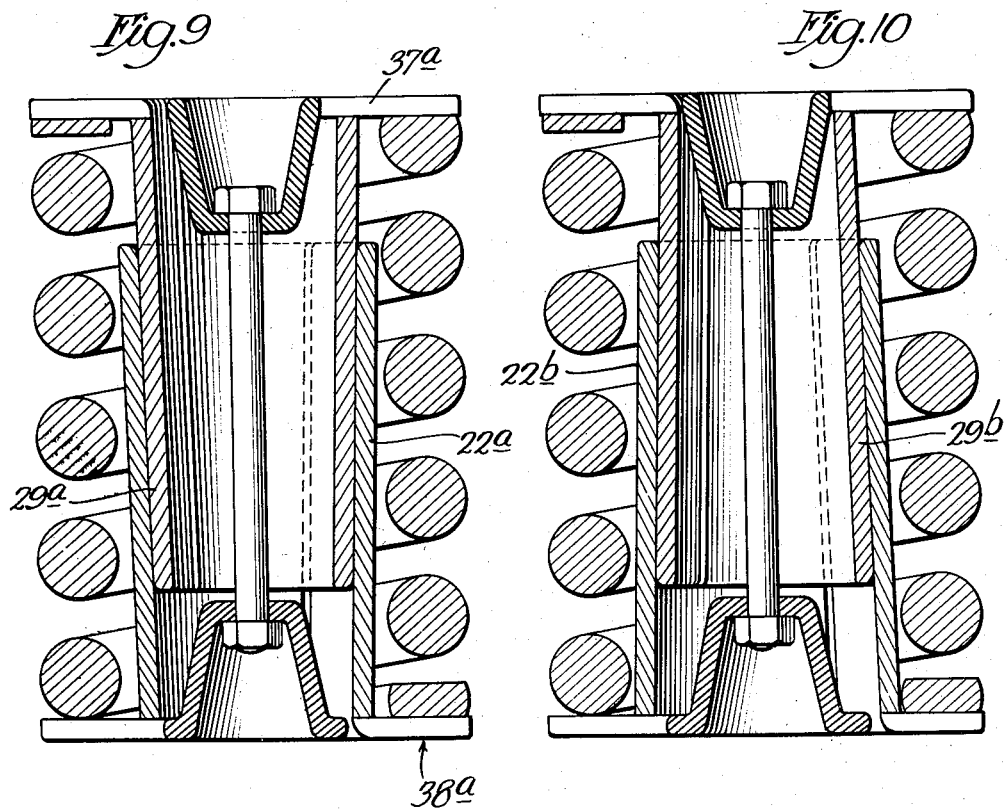
INVENTORS
Cyrus J. Holland
BY Arthur H. Carlson Patented Sept. 19, 1944

2,358,510

UNITED STATES PATENT OFFICE 2,358,510

SPRING SNUBBER UNIT

Cyrus J. Holland and Arthur H. Carlson, Chicago, Ill., assignors to Holland Company, a corporation of Illinois Application January 9, 1942, Serial No. 426,142

8 Claims. (Cl. 267—9)

This invention relates to snubber units for use in preventing harmonic vibration of springs in vehicles and the like.

One of the objects of the invention is the provision of means for dampening the vibration of springs either during their compression, their release, or both.

Another object of the invention is the provision of a new and improved shock absorbing unit that is so constructed that it will have a continuous and constant resistance to the free vibration of springs and spring assemblies, or that will offer a greater resistance to compression than to release of the spring or spring assembly, or vice versa.

Another object of the invention is the provision of a new and improved method of making a resilient unit so constructed as to exert a snubbing action on the spring or spring assembly with which it is employed.

A further object of the invention is the provision of a new and improved snubber unit that is inexpensive to manufacture, efficient in use, easily assembled, and that may be readily installed wherever it is employed.

Other and further objects and advantages of the invention will appear from the following description taken in connection with the accompanying drawings, in which Fig. 1 is a side elevation of a railway truck showing the invention positioned therein, and with parts broken away;

Fig. 2 is a vertical section of the snubber or friction unit;

Fig. 3 is a top plan view thereof;

Fig. 4 is a perspective view of the upper spring plate;

Fig. 5 is a perspective view of the upper friction sleeve or cylinder;

Fig. 6 is a perspective view of the lower friction sleeve or cylinder;

Fig. 7 is a perspective view of the lower spring plate;

Figs. 4, 5, 6 and 7 together constitute an exploded view of the snubber unit, with the spring omitted;

Fig. 8 is a section on the line 8—8 of Fig. 2;

Fig. 9 is a longitudinal or vertical sectional view of a modified form of construction; and Fig. 10 is a vertical or longitudinal view of a further modified form of snubber or friction unit.

The unit is especially useful in vehicle suspension, and more particularly in spring suspension for railway trucks. Free-acting springs, when employed for supporting car bodies, develop harmonic vibration due to the rail joints which yield under the weight of the car to a greater extent than the other portion of the rail; hence, at a certain rate of speed over these rails when the number of rail joints passed over in a given interval of time correspond to the natural vibration of the spring under the load it supports, harmonic action develops. As the truck rolls over each joint there is an additional impetus given to the spring and load until this harmonic vibration builds up, sometimes to the danger point. Frictional resistance in the spring suspension prevents this harmonic action to a large extent, if not altogether, depending upon the amount of friction developed.

Referring now to the drawings, the reference character 10 designates a truck having a side frame 11 provided with a bolster opening 12 through which the bolster 13 extends, as is usual in such constructions. The side frame 11 is provided with the usual compression member 14, the tension member 15, and the pedestals 16, 17, at each side of the opening 12. A spring assembly 18, seated on the tension member 15 and extending beneath the bolster 13, is adapted to resiliently support the bolster.

The spring assembly 18 comprises one or more helical springs 19, one of which has been replaced by a snubber unit 21 of a construction that will presently be described. The snubber unit is adapted to be used in connection with the spring assembly at each end of the bolster, and is adapted to replace one or more of the springs 19. If only two of these units be employed for the bolster, one at each end thereof, they will be so arranged that the bolster will be properly balanced, as, for instance, if the unit is substituted for one of the front springs at one end of the bolster, it will be substituted for one of the rear springs at the other end of the bolster.

The snubber unit, as shown in Figs. 2 to 8, comprises a lower or base friction member 22, which is in the form of a sleeve, being slotted throughout its length, as at 23, Fig. 6. The lower end of the friction member 22 is provided with radially extending segmental flanges 24, 25 and 26. The flange 24 is opposite the flanges 25, 26, as clearly shown in Fig. 3 of the drawings. The flanges 25, 26, may be considered as a divided flange, as the two together are of substantially the same area and shape as the flange 24. The upper inner edge 27 of the sleeve 22 is rounded, as shown at 28 in Fig. 2, for riding over the inequalities on the surface of the cooperating friction member, as will presently appear.

Cooperating with the lower friction member 22 is an upper tubular or sleeved friction member 29, which is provided at its upper end with radially extending flanges 31, 32 and 33. The sleeve 29 is provided with an elongated slit which extends the full length of the sleeve, and the two meeting edges of the sleeve are forced apart to form a slot 34, Figs. 3 and 5. The sleeve member 29 has its lower outer edge rounded, as shown at 35 in Fig. 2, in order to ride over the inequalities on the interior surface of the lower friction member 22 when the parts are in operation.

The friction member 29 is adapted to be contracted and forced into the sleeve member 22, and when it is released both sleeves will be stressed, the sleeve 29 tending to expand and the sleeve 22 tending to contract, so that friction is developed between the contacting surfaces of the two sleeves. The amount of friction developed will depend on the dimensions of the sleeves and the thickness and nature of the material constituting their construction.

In the normal operation of the spring assembly the sleeves 29 and 22 will move relatively to each other as the spring assembly is compressed and released. As the parts are used more or less wear develops, and since the normal compression will remain within certain limits the wear on the sleeve between these limits will be normally greater than will be the wear due to the abnormal compression and release of the springs, and consequently there will be a tendency to form shoulders at the extreme ends of these limits. By providing the rounded edges 28 and 35 the sleeves will ride over these shoulders during the abnormal compression and extension of the unit. This is considered an important feature of this construction.

Extending between the flanges of the upper and lower friction member is the spring 36, as shown in Fig. 2. The friction between the sleeves is such that when the unit and the spring 36 are compressed the spring will restore the parts to normal position after release.

Suitable means are provided for holding the parts in assembled relation. In the form of construction shown an upper spring plate 37, a lower spring plate 38, and means for connecting the two are provided for this purpose. The plate 37 is provided with segmental flanges 39 and 41, which are opposite each other and are complements of the flanges 31 and the flanges 32, 33. The central portion of the plate is provided with a recess or depression 42, which is adapted to extend into the upper end of the friction sleeve member 29, as shown in Fig. 2, when the parts of the unit are assembled. The depression 42 is provided with an axial opening 45 through which the tie member 46 extends.

The lower spring plate 38 is similar to the spring plate 37, and is provided with a recess or depression 49 having an axial opening 51 for receiving the lower end of the bolt or tie member 46, as shown more clearly in Fig. 2 of the drawings. The spring plate 38 has flange segments 52, 53, which are complements of the flanges 24, and 25, 26. The flanges 52, 53, occupy the space between the flanges 24, 25, and between the flanges 24, 25, respectively. When the parts are in assembled relation the flanges 31, 32, 33, 39 and 41 are intercalated and are all in the same plane, and likewise the flanges of the lower sleeve member and the lower spring plate are in the same plane parallel with the upper flanges. The tie member 46 may be in the form of a bolt, as shown, having a nut 54 on one end. The unit may be placed under slight initial compression which will hold the parts in assembled relation when the tie member 46 is in position. The recesses in the spring plates provide sufficient clearance for the tie member when the unit is compressed.

In the form of construction shown in Figs. 1 to 8, the friction members are cylindrical, and consequently substantially the same amount of resistance to the compression of the spring assembly is developed on release as on compression. If it is desired to have more resistance during compression than on release, so that the friction developed by the friction members or sleeves will assist in supporting the load, either or both the friction members 22ª and 29ª may be more or less tapered. The upper or inner sleeve member 29ª will be tapered toward its lower end, and the lower or outer sleeve member 22ª, if tapered, will be tapered toward its lower end, as shown more clearly, but somewhat exaggerated, in Fig. 9 of the drawings.

Since the upper spring plate 37ª, lower spring plate 38ª, and the flanges on the sleeves and spring plates are the same as that already described, it is not thought necessary to repeat the description at this point.

If it is desired that the snubber unit function to resist the movement of the spring assembly in the release movement mainly, the outer sleeve 22ᵇ and the inner sleeve 29ᵇ are both tapered toward the top, as shown more or less exaggerated in Fig. 10 of the drawings. It will be seen by an inspection of Fig. 10 that when the snubber unit is compressed the sleeves 22ᵇ and 29ᵇ will gradually release, and a gradually decreasing amount of friction will be developed during the compression of the unit. The reverse obtains upon release of the unit. In the constructions shown the upper friction member is within the lower, but if the parts be reversed the members will be tapered in the opposite directions for accomplishing the same results. Since the remaining structure of the unit is substantially the same as that already described, it is not thought necessary to repeat the description.

In all forms of the device the flanges on the friction members will cause the binding of the walls of the sleeve at the flanged end thereof to take place between the flanges, and will cause the remainder of the sleeve to be more or less distorted along differential lines, thereby permitting the use of metal of a thinner gauge than would be possible with unflanged split cylinders.

The split sleeve friction members may be made in any suitable manner, as by stamping the blanks from plates or sheet metal, and then by forging or otherwise bending the flanges to position, and the plates to cylindrical or other desired form, or they may be made from tubes of the desired material or diameter by slitting the tubes, cutting to lengths, and forming or otherwise bending the material to form the flanges. The spring plates may be stamped or even cast, if desired.

It is thought from the foregoing, taken in connection with the accompanying drawings, that the construction and operation of our device will be apparent to those skilled in the art, and that changes in size, shape, proportion and detail may be made without departing from the spirit and scope of the appended claims.

We claim as our invention:

1. A snubber unit for use on railway car spring suspension comprising a pair of split sleeves members telescopically and frictionally engaging each other, flange segments extending radially outwardly from the outer ends of said members, a spring plate at each end of said unit, each plate being in the form of segments of a circle having a recessed central portion, a tie member connecting said central portion for limiting the separation of said sleeve members, the segments of said plate and sleeve flanges being intercalated and in the same plane, and a spring engaging the segments of said plate and adjacent sleeve at the ends of said unit.

2. A snubber unit comprising an upper split tubular friction member of resilient material, a lower split tubular friction member of resilient material telescopically engaging the upper member, each member being under radial stress toward the other when assembled whereby the compression of the unit will be frictionally resisted, said members having segmental flanges, a spring plate at each end of said unit having flanges intercalated with the flanges of said members, and a spring engaging the flanges at the ends of said unit for resisting compression of said unit and for returning the parts to normal expanded condition after release.

3. A snubber unit comprising an upper split tubular friction member of resilient material, a lower split tubular friction member of resilient material telescopically engaging the upper member, the inner ends of said members being free of flanges and the opposite ends being unconfined and having flanges spaced apart about their peripheral edges, said members frictionally engaging each other, one of said members being tapered in such manner that the frictional resistance will increase as the unit is compressed, a spring plate having segmental radial flanges at each end of the unit, and means including a spring engaging the flanges of said spring plates and friction members for resisting compression of said unit and for returning the parts to normal expanded condition.

4. A snubber unit for use in a railway truck suspension comprising an upper split tubular friction member, a lower split tubular friction member telescoping the upper member and frictionally engaging the same, the outer ends of said sleeves having radially extending segmental flanges, a plate member having segmental flanges engaging the outer ends of each friction member, a spring having its ends engaging said plate members and said flanges for resisting the compression of said unit, portions of the outer ends of said members being unconfined and free of flanges, and means connected to said plate members for limiting the release of said unit.

5. A snubber unit comprising an upper split tubular friction member of resilient material, a lower split tubular friction member of resilient material telescopically engaging the upper member, said members frictionally engaging each other, segmental flanges about the outer ends of said members, spring plates having segmental flanges at the ends of said snubber unit interdigitated with the flanges of said tubular friction members, a spring between the segmental flanges of said spring plates and said tubular friction members for resisting the compression of said unit, at least one of said members being so tapered that the friction between said members will decrease upon compression and will increase during the expansion of the unit, and means engaging said spring plates for limiting the extension of said unit.

6. A snubber unit for use on railway car spring suspension comprising a pair of split sleeve members telescopically and frictionally engaging each other, flange segments spaced apart and extending radially outwardly from the outer ends of said members, the thickness of the metal of each sleeve being substantially uniform throughout the circumference of the sleeves, the outer ends of said sleeves each having a flange segment closely adjacent each side of the split and one opposite said split, the one opposite the split having a width substantially equal to the combined width of the other two, the external diameter of the inner of said members being normally slightly greater than the normal internal diameter of the outer member whereby relative movement of said members is frictionally resisted, and a spring member engaging said flanges for resisting the compression of said unit and for restoring the parts to normal position after release, the adjacent edges of the inner ends of said members being rounded for riding over inequalities on the interior and exterior engaging surfaces of said members.

7. A cushioning unit for a truck bolster comprising a lower split sleeve member, an upper split sleeve friction member frictionally engaging said lower member, the material of said sleeves being of stamped sheet metal and uniform in thickness and each sleeve having at its outer end radially extending flanges closely adjacent the split and a segmental radially extending flange opposite said split of a width substantially equal to the combined widths of the other flanges for offering material resistance to the spreading of the split sleeves, one of said members telescoping the other member, a spring plate at the flanged end of each sleeve, each of said plates having oppositely arranged flanges in the planes of the flanges of said sleeves and occupying the major portion of the spaces between the last-named flanges, and a coil spring engaging said flanges for returning the parts to normal position during release.

8. A snubber unit for use on railway car spring suspension comprising a pair of stamped sheet metal split sleeve members telescopically and frictionally engaging each other, segmental flanges spaced apart and extending radially outwardly from the outer ends of said members, one flange of each sleeve being opposite the split in the sleeve and of such circumferential extent as to offer great resistance to the opening of the split sleeve, the external diameter of the inner of said members being normally slightly greater than the normal internal diameter of the outer member whereby relative movement of said members is frictionally resisted, the thickness of the metal of each sleeve being substantially uniform throughout the circumference of said sleeves, a spring member engaging said flanges for resisting the compression of said unit and for restoring the parts to normal position upon release, and a spring plate at the flanged end of each sleeve, each of said plates having flanges in the planes of the flanges of the sleeves and between the last-named flanges.

CYRUS J. HOLLAND.
ARTHUR H. CARLSON.